(12) United States Patent
Schmid et al.

(10) Patent No.: US 12,128,514 B2
(45) Date of Patent: Oct. 29, 2024

(54) TOOL APPARATUS AND METHOD

(71) Applicant: Festool GmbH, Wendlingen (DE)

(72) Inventors: Markus Schmid, Uhingen (DE); Christian Schock, Schorndorf (DE)

(73) Assignee: Festool GmbH, Wendlingen (DE)

( * ) Notice: Subject to any disclaimer, the term of this patent is extended or adjusted under 35 U.S.C. 154(b) by 300 days.

(21) Appl. No.: 17/604,053

(22) PCT Filed: Mar. 9, 2020

(86) PCT No.: PCT/EP2020/056165
§ 371 (c)(1),
(2) Date: Oct. 15, 2021

(87) PCT Pub. No.: WO2020/212017
PCT Pub. Date: Oct. 22, 2020

(65) Prior Publication Data
US 2022/0203489 A1 Jun. 30, 2022

(30) Foreign Application Priority Data

Apr. 16, 2019 (DE) .......................... 102019205475.7

(51) Int. Cl.
*F16D 49/20* (2006.01)
*B23Q 11/00* (2006.01)
*F16D 65/06* (2006.01)
*B27B 5/38* (2006.01)

(52) U.S. Cl.
CPC .......... *B23Q 11/0092* (2013.01); *F16D 49/20* (2013.01); *F16D 65/06* (2013.01); *B27B 5/38* (2013.01)

(58) Field of Classification Search
CPC ..... B23Q 11/0092; F16D 49/20; F16D 65/06; B27B 5/38
(Continued)

(56) References Cited

U.S. PATENT DOCUMENTS 3,908,511 A 9/1975 Spiantini et al.
4,072,218 A 2/1978 Specht et al.
(Continued)

FOREIGN PATENT DOCUMENTS

CN 207433504 U 6/2018
DE 202006007555 U1 9/2007
(Continued)

OTHER PUBLICATIONS

Notice of Reasons for Refusal issued in corresponding Japanese Patent Application No. 2021-560906, Oct. 24, 2023, 8 pages w/translation.

(Continued)

*Primary Examiner* — Chinyere J Rushing-Tucker
(74) *Attorney, Agent, or Firm* — HSML P.C.

(57) ABSTRACT

The invention relates to a tool apparatus (10) with a drivable tool (1), comprising a shaft (2) which is coupled to the tool (1), further comprising one or plural braking bodies (3) which in particular are arranged distributed around the shaft (2) in the circumferential direction, wherein the tool apparatus (10) is adapted to bring the one or plural braking bodies (3) from a release state into a braking state in the course of a braking procedure, wherein in the braking state the one or the plural braking bodies (3) are in contact with the shaft and thereby exert a braking force upon the shaft (2), so that the shaft (2) and thereby also the tool (1) are braked and wherein in the release state the one or the plural braking bodies (3) are not in contact with the shaft (2).

15 Claims, 5 Drawing Sheets

(58) Field of Classification Search
 USPC .............................................................. 173/1
 See application file for complete search history.

(56) References Cited

U.S. PATENT DOCUMENTS

| | | | |
|---|---|---|---|
| 4,145,940 A | 3/1979 | Woloveke et al. | |
| 4,267,914 A | 5/1981 | Saar | |
| 7,055,417 B1 | 6/2006 | Gass | |
| 2005/0057206 A1 | 3/2005 | Uneyama | |
| 2011/0048197 A1* | 3/2011 | Winkler | B23Q 11/0092 |
| | | | 188/74 |
| 2017/0254374 A1 | 9/2017 | Fukami | |

FOREIGN PATENT DOCUMENTS

| | | |
|---|---|---|
| DE | 602004005115 T2 | 11/2007 |
| EP | 1234285 B1 | 6/2016 |
| FR | 2739586 A1 | 4/1997 |
| JP | 56-15983 | 2/1981 |
| JP | 2005-088248 | 4/2005 |
| JP | 2008-291880 | 12/2008 |
| JP | 2016-050639 | 4/2016 |
| WO | 2017/196187 | 11/2017 |

OTHER PUBLICATIONS

English translation of Office Action issued in Chinese Patent Application No. 202080029211.1, Apr. 13, 2022, 8 pages.
International Search Report and Written Opinion, International Patent Application No. PCT/EP2020/056165, Jun. 26, 2020, with English translation of Search Report (17 pages).
Examination Report issued in German Patent Application No. 102019205475.7, Dec. 23, 2019 (5 pages).

* cited by examiner

TOOL APPARATUS AND METHOD

The invention relates to a tool apparatus with a drivable tool. The tool apparatus comprises a shaft which is coupled to the tool. Expediently, the tool is drivable via the shaft.

BACKGROUND OF THE INVENTION

EP 1 234 285 B1 describes a bench saw with a braking mechanism which comprises at least one pawl which is brought into engagement with the saw blade for stopping the rotating saw blade.

SUMMARY OF THE INVENTION

An object of the invention lies in providing a tool apparatus which can be operated with less effort.

This object is achieved by a tool apparatus according to claim 1. The tool apparatus comprises at least one braking body. The tool apparatus is adapted to bring the at least one braking body from a release state into a braking state in the course of a braking procedure. In the braking state, the at least one braking body is in contact with the shaft and by way of this exerts a braking force upon the shaft, so that the tool is braked. In the release state, the at least one braking body is not in contact with the shaft.

In the aforementioned state of the art, a pawl is brought into engagement with the saw blade for stopping the saw blade. Herein, generally, a damaging of the saw blade and the pawl occurs, so that both need to be exchanged, so that the bench saw can continue to be operated.

In contrast to this, in the described tool apparatus, the tool and/or the at least one braking body are expediently undamaged and/or can continue to be used, even after a braking of the tool, so that no exchange is necessary for the continued operation.

For this reason, the described tool apparatus can be operated with less effort.

According to a preferred design, the tool apparatus comprises plural braking bodies which are arranged in a manner distributed about the shaft in the circumferential direction. The circumferential direction can also be denoted as the revolving direction. The tool apparatus is adapted to bring the plural braking bodies from a release state into a braking state in the course of a braking procedure. In the braking state, the plural braking bodies are in contact with the shaft and by way of this exert a braking force upon the shaft, so that the tool is braked. In the release state, the plural braking bodies are not in contact with the shaft.

Advantageous further developments are the subject-matter of the dependent claims.

The invention further relates to a method for braking a tool which is coupled to a shaft, comprising the step: changing from a release state, in which the at least one braking body is not in contact with the shaft, into a braking state, in which the at least one braking body is in contact with the shaft and by way of this exerts a braking force upon the shaft, so that the tool is braked.

In a preferred configuration of the method, plural braking bodies which are arranged distributed around the shaft in the circumferential direction are present. In the step of the change, the plural braking bodies are brought from the release state into the braking state. In the release state, the plural braking bodies are not in contact with the shaft. In the braking state, the plural braking bodies are in contact with the shaft and by way of this exert a braking force upon the shaft, so that the tool is braked.

BRIEF DESCRIPTION OF THE DRAWINGS

Further exemplary details as well as exemplary embodiments are hereinafter described with reference to the figures. Herein are shown in FIG. 1 a schematic representation of a tool apparatus, FIG. 2 a sectioned representation of a braking device and of a shaft of the tool apparatus, wherein the tool apparatus is situated in a braking state, FIG. 3 a sectioned representation of a braking device and a shaft of the tool apparatus, wherein the tool apparatus is situated in a release state, FIG. 4 a sectioned view of an individual braking body, and FIG. 5 a perspective representation of an actuation section.

DETAILED DESCRIPTION OF THE INVENTION

In the following explanation, reference is made to the directions "x", "y" and "z" which are drawn in the figures (the x-direction runs perpendicularly to the plane of the drawing in the FIGS. 1 to 4). The x-direction, the y-direction and the z-direction are aligned orthogonally to one another. The x-direction and the y-direction can also be denoted as horizontal direction and the z-direction as vertical direction. The subsequently mentioned directions "radial direction" and "axial direction" in particular are to be understood with regard to the longitudinal axis of the shaft 2.

Figure 1:
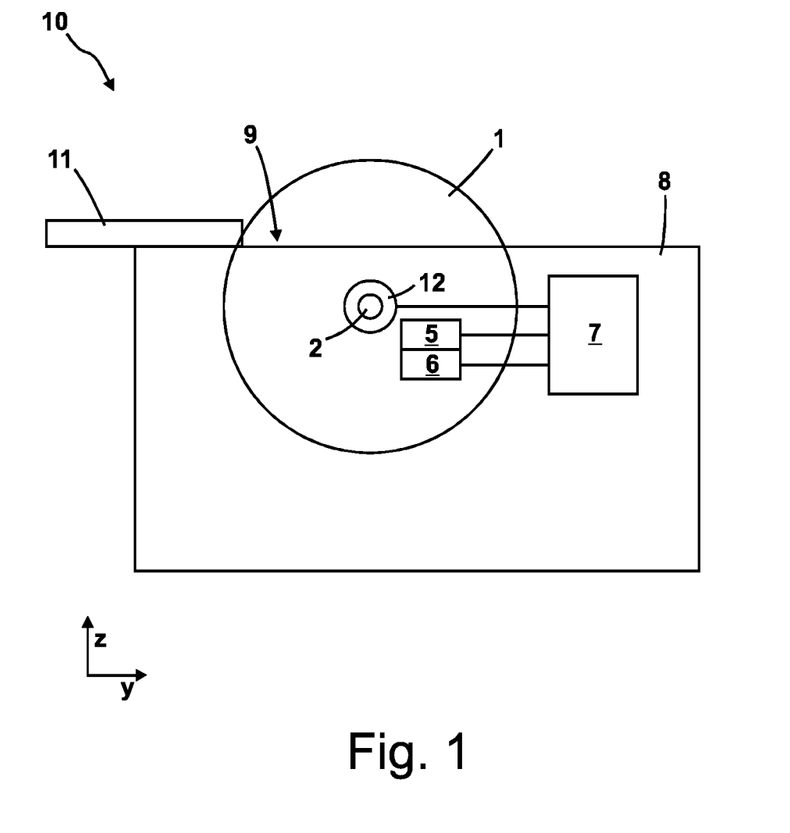

FIG. 1 shows a tool apparatus 10 with a drivable tool 1. The tool apparatus 10 comprises a shaft 2 which is coupled to the tool 1 and via which the tool 1 is expediently drivable.

Figure 2:
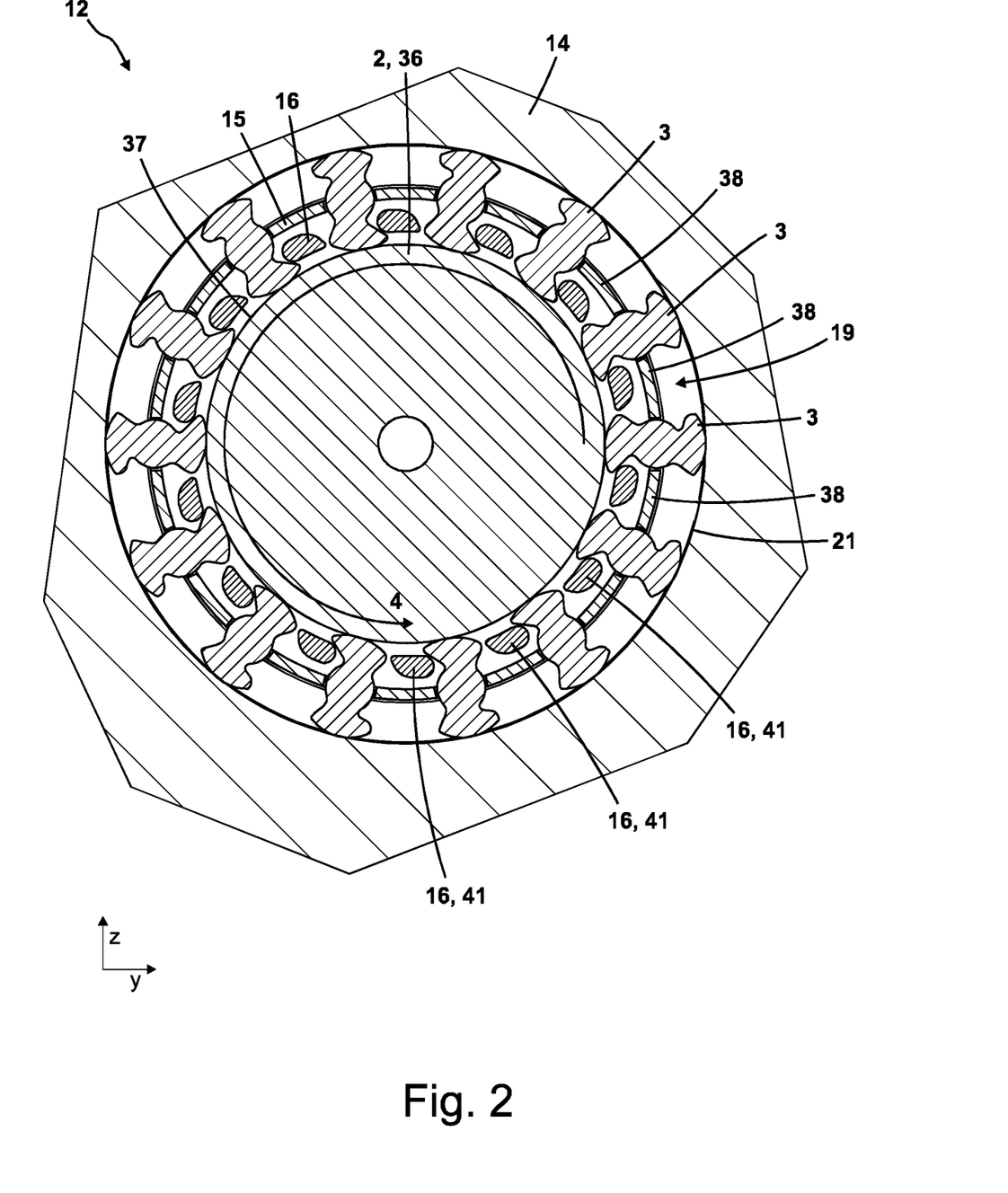
Figure 3:
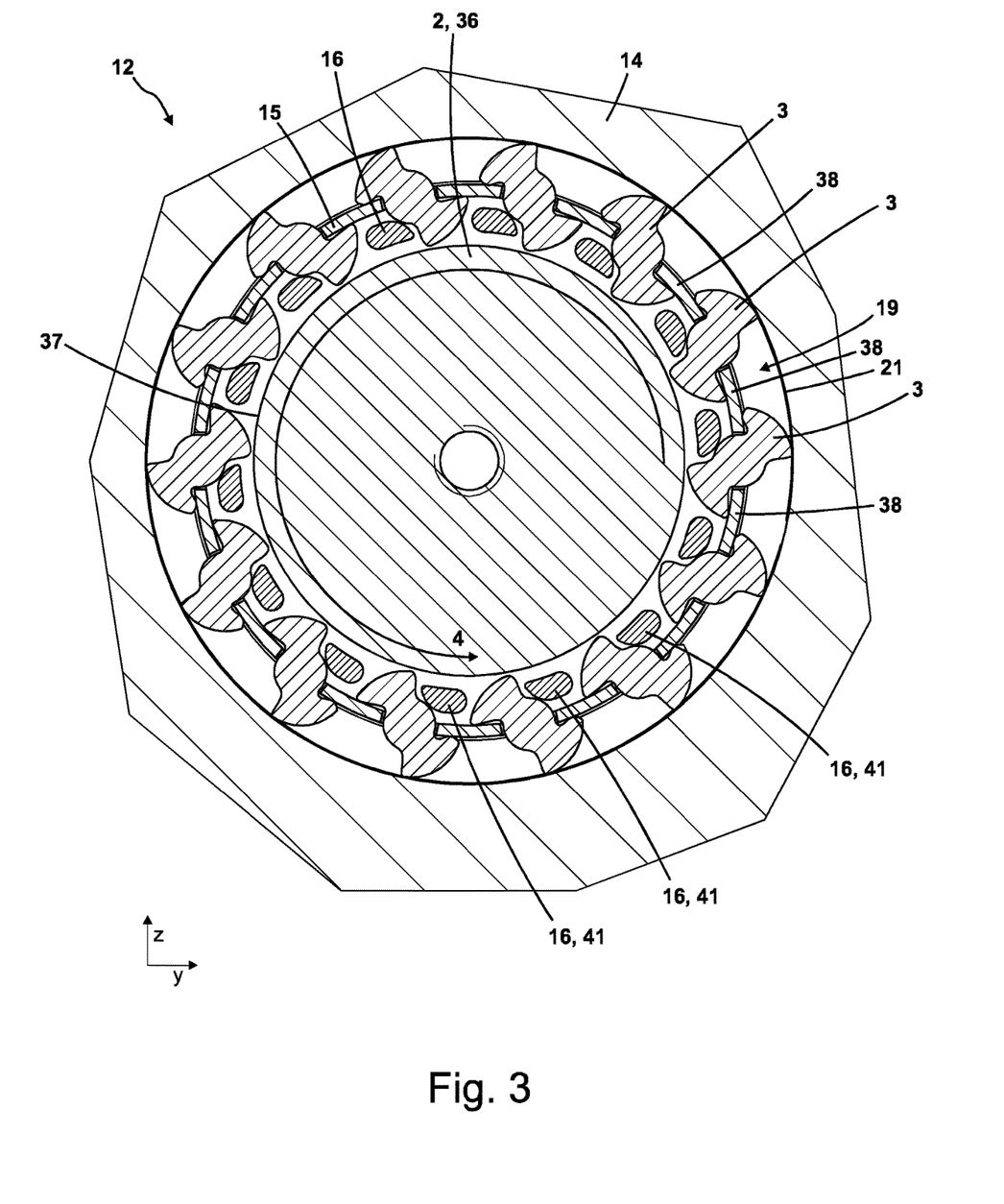

The tool apparatus 10 further comprises a plurality of braking bodies 2 which by way of example are shown in the FIGS. 2 and 3. For the sake of a better overview, in each case only three of the shown 14 braking bodies are provided with the reference numeral "3" in the FIGS. 2 and 3. The braking bodies 3 are arranged distributed around the shaft 2 in the circumferential direction 4.

Alternatively, the tool apparatus 10 can also comprise only one braking body.

The tool apparatus 10 is adapted to bring the braking bodies 3 from a release state into a braking state in the course of a braking procedure.

In the braking state which by way of example is shown in FIG. 2, the braking bodies 3 are in contact with the shaft 2. By way of this contact, the braking bodies 3 exert a braking force upon the shaft 2. The shaft 2 and thus also the tool 1 are braked by way of the braking force.

In the release state, the braking bodies 3 are not in contact with the shaft 2.

Further exemplary details are explained hereinafter.

Firstly regarding the tool apparatus 10:

The tool apparatus 10 is, for example, a saw, in particular a saw with a rotating saw blade as the tool 1. Preferably, the tool apparatus 10 is a circular bench saw. Alternatively to this, the tool apparatus 10 can also be designed as a different tool apparatus. In particular, the tool apparatus 10 can be designed as a stationary or semi-stationary machine. Furthermore, the tool apparatus 10 can be designed as a hand-held machine, in particular a hand-held machine tool. The tool apparatus 10 is preferably designed as a miter saw, plunge saw, safety hub saw, band saw, jig saw, router and/or angle grinder. The tool apparatus 10 in particular is a power tool.

The tool apparatus 10 by way of example comprises the tool 1, the shaft 2, a drive unit 5, an actuator unit 6 and a control unit 7. Furthermore, the tool apparatus 10 expediently comprises a support structure 8 and/or a lay-on surface 9.

The support structure 8 by way of example is designed as a housing. Expediently, the drive unit 5, the actuator unit 6 and/or the control unit 7 are accommodated in the support structure 8.

The lay-on surface 9 by way of example is arranged on the upper side of the support structure 8. The lay-on surface 9 serves for the laying-on of a workpiece 11 whilst the workpiece 11 is machined with the tool 1. By way of the example, the lay-on surface 9 represents an x-y plane. By way of example, the tool 1 projects out of the lay-on surface 9, in particular in the z-direction.

The drive unit 5 by way of example is designed as a rotation drive, in particular as an electric rotation drive. The drive unit 5 serves for driving the tool 1, in particular for bringing the tool 1 into rotation, preferably in the clockwise direction. The tool 1 is coupled to the drive unit 5 via the shaft 2. The drive unit 5 is designed to drive the shaft 2, in particular to bring it into rotation, by way of which the tool 1 is driven. By way of example, the tool 1 is connected to the shaft 2 in a rotationally fixed manner, so that the tool 1 co-rotates with the rotating shaft 2.

The shaft 2 in particular is a shaft of the drive train of the tool apparatus 10. The shaft 2 and the tool 1 are expediently rotatably mounted with respect to the support structure 8.

The shaft 2 is aligned with its longitudinal axis parallel to the x-direction. By way of example, the shaft 2 has a circularly cylindrical basic shape. The rotation axis of the tool 1 is expediently aligned parallel to the x-direction.

By way of example, the shaft 2 and the tool 1 are aligned coaxially to one another.

The actuator unit 6 expediently serves for selectively bringing the braking body 3 into the braking state or the release state, as is explained in more detail hereinafter.

The control unit 7 is expediently adapted to provide a drive unit control signal to the drive unit 5, in order to cause the drive unit 1 to drive the tool 1.

The control unit 7 is expediently further adapted to provide an actuator unit control signal to the actuator unit 6, in order to cause the actuator unit 6 to bring the braking bodies 3 into the braking state and/or the release state.

The control unit 7 is expediently further adapted to detect an emergency state and to activate the braking procedure on the basis of the detected emergency state, in particular by way of providing the actuator unit control signal to the actuator unit 6.

The emergency state is in particular a situation which is potentially dangerous for a user and in which the user can be injured, for example by way of the tool and/or the workpiece.

The control unit 7 is expediently adapted to detect the emergency state on the basis of a detected contact between the tool 1 and the human body, for example a finger.

The control unit 7 is expediently further adapted to detect a kickback as the emergency state.

The term "kickback" in particular means a state in which, during the machining of the workpiece by the tool apparatus, a sudden and unexpected force occurs between the tool apparatus and the workpiece, by way of which force the tool apparatus and/or the workpiece is brought into motion.

The tool apparatus 10, in particular the control unit 7 is preferably adapted to feed an electrical detection signal to the tool 1 and to detect the emergency state on the basis of a change of the detection signal. Expediently, the tool apparatus 10, in particular the control unit 7, is adapted to feed the electrical detection signal to the tool 1 by way of capacitive coupling. Expediently, the tool apparatus 10, in particular the control unit 7, is adapted to detect the emergency state, in particular the contact between the tool 1 and the human body, on the basis of a capacitive change. Further details as to how the detection of the emergency state may be realised by way of example are described in EP 1 234 285 B1.

Hereinafter, the braking device 12 is to be dealt with in more detail with reference to FIGS. 2 and 3.

The tool apparatus 10 comprises a braking device 12 which comprises the aforementioned braking bodies 3, with which braking bodies 3 the shaft 2 and therefore also the tool 1 can be braked. The tool apparatus 10 is adapted to carry out the braking procedure of the tool 1 amid the use of the braking device 12. In particular, the tool apparatus 10 is adapted, by way of carrying out the braking procedure, to bring the tool 1 to a standstill within 5 ms or less, expediently from a driven, in particular rotating state of the tool 1, in which state a machining of the workpiece 11 is effected or can be effected.

The braking device 12 is preferably designed as a freewheel brake. Expediently, the braking device 12 is integrated in the tool apparatus 10. The braking device 12 is in particular an actively switched brake (preferably via the control unit 7 and/or the actuator unit 6). The braking device 12 in particular is adapted to be reversible, so that it can be brought from the braking state back into the release state (and from there expediently back into the braking state), preferably without having to exchange a component of the braking device 12 for this.

By way of example, the braking device 12 comprises the braking bodies 3, a braking section 14, a holding section 15 and an actuation section 16.

The braking device 12 in particular functions as follows: For braking the tool 1, expediently the actuation section 16 is firstly moved, in particular rotated, by way of the actuator unit. By way of the movement of the actuation section 16, expediently the braking bodies 3 are brought from the release state into the braking state, in particular by way of a respective pivoting of the braking bodies 3. Expediently, the braking bodies 3 come into contact with the shaft 2 on the way from the release state to the braking state and are assisted in their movement towards the braking state by way of the rotation movement of the shaft 2. In the braking state, the braking bodies 3 are clamped between the shaft 2 and the braking section 14. In particular, the braking bodies 3 exert a braking force upon the shaft 2 on account of a supporting, in particular a radial and/or tangential supporting of the braking bodies 3 on the braking section 14. The shaft 2 and thus also the tool 1 is braked, in particular up to the standstill of the tool 1, by way of the braking force.

Exemplary designs of the individual components of the braking device 12 are dealt with in detail hereinafter:

Firstly to the braking section 14:

The braking section 14 by way of example is a part of the support structure 8 or is connected to the support structure 8 in a rotationally fixed manner, in particular to the support structure 8 which is designed as a housing. The braking section 14 in particular is a stationary section, in particular relative to the shaft 2. Expediently, the braking section 14 does not co-rotate with the shaft 2.

According to a possible design, the braking section 14 is designed as a brake drum.

By way of example, the braking element 14 surrounds the shaft 2, in particular in the circumferential direction 4. In particular, the braking element 14 embraces the shaft 2. Expediently, the braking element 14 further surrounds the braking bodies 3 and in particular the holding section 15 and/or the actuation section 16.

The braking element 14 by way of example defines an in particular cylindrical interior 19, in which the braking bodies 3 and the shaft 2 are arranged. Expediently, furthermore the holding section 15 and/or the actuation section 16 are arranged in the cylindrical interior 19.

The braking section 14 expediently provides a braking surface 21. The braking surface 21 is expediently the inwardly directed surface of the braking section 14, in particular the surface which defines the cylindrical interior 19. The braking surface 21 by way of example has the shape of a cylinder jacket. Expediently, the braking surface 21 supports the braking bodies 3.

The braking section 14 is expediently designed as an outer ring. Expediently, the braking bodies 3 are supported on the inner circumference of the braking section 14.

The braking bodies 3 are to be dealt with next:

By way of example, 14 braking bodies 3 are present. Expediently, more or fewer braking bodies 3 can be present. Preferably, at least 3, 5, 7, 10, 12 or 14 braking bodies 3 are present.

The braking bodies 3 are expediently parts which are separate from one another, in particular individual parts.

The braking bodies 3 are arranged in a manner distributed around the shaft 2—in particular around the longitudinal axis of the shaft 2. In particular, the braking bodies 3 are arranged around the shaft 2 in the circumferential direction 4. The braking bodies 3 are expediently located in an annular region which surrounds the shaft 2 and/or is arranged coaxially to the shaft 2. The braking bodies 3 are preferably located exclusively in this annular region. The annular region in particular is a radial region with respect to the shaft 2. In particular, the annular region lies between the shaft 2 and the braking section 14.

The braking bodies 3 are expediently arranged uniformly around the shaft 2, in particular at the same angular distances. The braking bodies 3 expediently lie on a circular path which runs around the shaft 2.

The braking bodies 3 are expediently arranged between the shaft 2 and the braking section 14, in particular in the radial direction (with respect to the longitudinal axis of the shaft 2). Expediently, the braking bodies 3 are supported radially on the braking element 14. In particular, the braking bodies 2 are fixed radially on the braking section 14. In particular, the braking bodies 3 are fixed relative to the braking section 14 in the circumferential direction. Expediently, the braking bodies 3 are fixed on the holding section 15 in the circumferential direction. The holding section 15 is expediently connected to the braking section 14 in a rotationally fixed manner.

The braking bodies 3 are expediently each pivotably mounted, expediently with respect to the braking section 14 and/or the holding section 15. Each braking body 3 is expediently pivotably mounted about its own (imagined) pivot axis. The pivot axes of the braking bodies 3 expediently run parallel to the x-direction and/or parallel to the longitudinal axis of the shaft 2.

Preferably, the braking bodies 3 are biased and/or spring-loaded with respect to the braking section 14 and/or the holding section 15. The biasing and/or the spring-loading of the braking bodies 3 expediently exerts a torque relative to the respective pivot axis, in particular in the clockwise direction, upon each braking body 3.

The braking bodies 3 each comprise a first contact section 17 with a ramp-shaped first contact contour 18 which, in the braking state, is in contact with the shaft 2.

Figure 4:
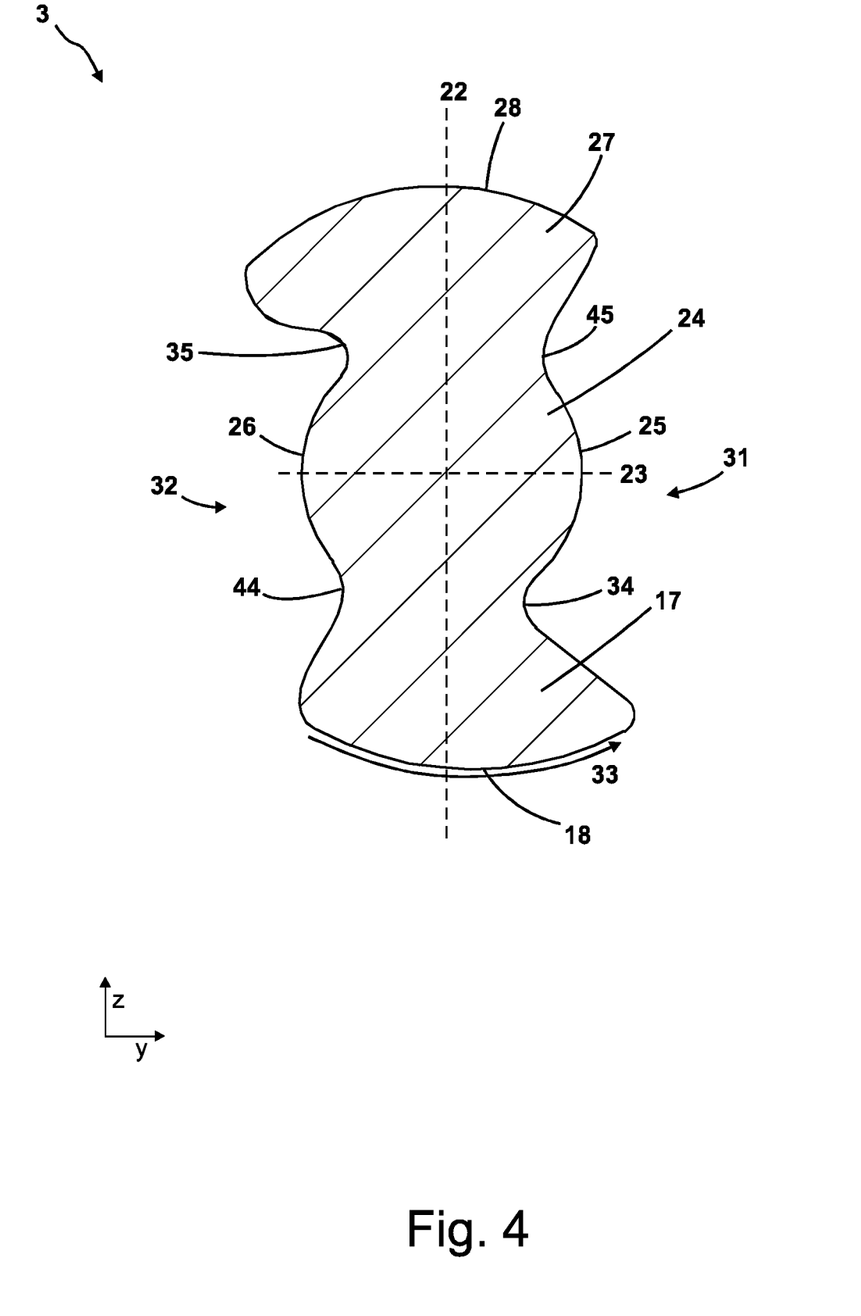

An exemplary design of the a braking body 3 is to be explained with reference to FIG. 4. The explanation expediently applies to several, in particular to all braking bodies 3 of the braking device 12.

The braking body 3 by way of example extends along a body axis 22. The body axis 22 expediently lies in a y-z plane and preferably runs orthogonally to the x-direction and/or the longitudinal axis of the shaft 2. The extension of the braking body 3 along the body axis 22 is preferably larger than the extension of the braking body 3 along a transverse axis 23 which runs orthogonally to the body axis 22 and lies in a y-z plane. By way of example, the extension of the braking body 3 in the direction of the body axis 22 is at least 1.5 times as large as the extension of the braking body 3 in the direction of the transverse axis 23.

Alternatively, the extension of the braking body 3 along the body axis 22 is the same or smaller than the extension of the braking body along the transverse axis 23.

The braking body 3 comprises a first side 31 and a second side 32 which respectively lie on opposite sides of the body axis 22.

The braking body 3 by way of example comprises a bearing section 24 which is arranged centrally in the direction of the body axis 22. The bearing section 24 preferably comprises a first convex region 25 and a second convex region 26. The convex regions 25, 26 by way of example are oriented in opposite directions and/or perpendicularly to the transverse axis 23. By way of example, the first convex region 25 lies on the first side 31 and the second convex region 26 on the second side 32. By way of example, the convex regions 25, 26 each have the shape of a circle segment.

The braking body 3 by way of example is pivotably mounted with its bearing section 24, in particular with the convex regions 25, 26, on the holding section 15. The shape of the convex regions 25, 26 expediently defines the pivoting movement which can be carried out by the braking body 3.

By way of example, a first contact section 17 follows the bearing section 24, in particular in a first direction along the body axis 22. The first contact section 17 serves for contacting the shaft 2 in the braking state.

The contact section 17 comprises a ramp-shaped first contact contour 18 which, in the braking state, is in contact with the shaft 2. The contact contour 18 by way of example is oriented perpendicularly to the body axis 22. The contact contour 18 by way of example has a curved, in particular convex course.

Expediently, the radius of the braking body 3 changes along the circumference. In particular, the radius of the braking body 3—by way of example the distance between the pivot axis of the braking body 3 and the contact contour 18—increases along a first contact contour circumferential direction 33. The contact contour circumferential direction 33 by way of example runs from the second side 32 to the first side 31 and/or oppositely to the rotation direction of the shaft 2.

By way of example, a second contact section 27 follows the bearing section 24, in particular along the body axis 22 in a second direction which is opposite to the first direction. The second contact section 27 serves for contacting the braking section 14 in the braking state.

The second contact section 27 by way of example comprises a second contact contour 28 which in the braking state is in contact with the braking section 14. The contact contour 18 by way of example is oriented perpendicularly to the body axis 22. The contact contour 18 by way of example has a curved, in particular convex course.

The braking body 3 expediently further comprises a first concave region 34 and a second concave region 35. The first concave region 34 expediently represents the transition from the bearing section 24 to the first contact section 17, said transition lying on the first side 31. The second concave region 35 expediently represents the transition from the bearing section 24 to the second contact section 27, said transition lying on the second side 32.

As is shown in FIG. 3, the braking bodies 3 in the release state expediently bear with their first and second contact regions 34, 35 on the holding section 15.

Optionally, the braking body 3 further comprises a third concave region 44 and a fourth concave region 45. The third concave region 44 expediently represents the transition from the bearing section 24 to the first contact section 17, said transition lying on the second side 32. The fourth concave region 45 expediently represents the transition from the bearing section 24 to the second contact section 27, said transition lying on the first side 31.

The shaft 2 is to be dealt with in more detail hereinafter:

The shaft 2 expediently comprises an axial section 36 which the braking bodies 3 contact in the braking state. The axial section 36 is preferably designed in a circularly cylindrical manner. The base surface of the axial section 36 preferably has the shape of an exact circle. The braking bodies 3 expediently bear on the outer lateral surface 37 of the axial section 36 in the braking state. The lateral surface 37 of the axial section 36 expediently has the shape of an (outer) lateral surface of a circular cylinder. The lateral surface 37 of the axial section 36 expediently has no projections and/or no indentations. The lateral surface of the axial section 36 in particular is designed in a plane and/or smooth manner.

The holding section 15 is hereinafter dealt with in more detail.

In particular, the holding sections 15 serves for supporting the braking bodies 3 in the circumferential direction and/or for providing the pivotably movable mounting of the braking bodies 3.

The holding section 15 by way of example is designed as a cage, in particular a free-wheel cage. In particular, the holding section 15 is designed in an annular and/or circular-cylinder-shaped manner and is expediently arranged coaxially to the shaft 2.

The holding section 15 is expediently arranged between the shaft 2 and the braking section 14, in particular in the radial direction. Expediently, the holding section 15 embraces or runs around the shaft 2. Expediently, the holding section 15 is arranged distanced to the shaft 2.

The holding section 15 is preferably fixed on the braking section 14. In particular, the holding section 15 is mounted relative to the braking section 14 in a rotationally fixed manner. The holding section 15 in particular is mounted in a manner such that it does not co-rotate with the shaft 2.

The holding section 15 comprises a plurality of holding segments 38. By way of example, the number of holding segments 38 is the same as the number of braking bodies 3. For the purpose of a better overview, in each of FIGS. 2 and 3 only three of the shown 14 holding segments 38 are provided with the reference numeral "38".

The holding segments 38 expediently lie on a circular path which runs around the shaft 2. By way of example, the holding segments 38 are distanced to the shaft 2 and/or the braking section 14.

The holding segments 38 by way of example each have the shape of a ring section. Each holding element 38 is expediently arranged between two braking bodies 3. Each holding segment 38 expediently runs from a bearing section 24 of a first braking body 3 to a bearing section 24 of a second braking body 3.

Figure 5:
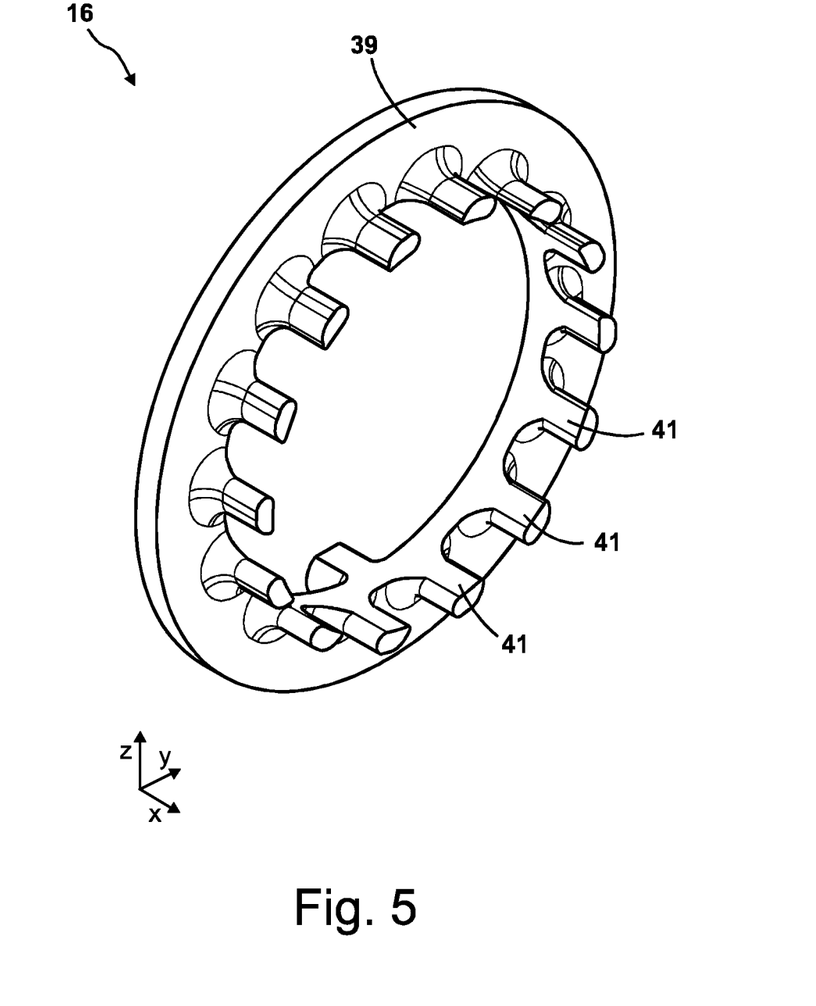

The actuation section 16 is to be dealt with in more detail hereinafter. An exemplary design of the actuation section 16 is shown in FIG. 5.

The actuation section 16 in particular serves for effecting the bringing of the braking bodies 3 from the release position into the braking position and/or from the braking position into the release position.

The actuation section 16 is expediently arranged between the shaft 2 and the braking section 14, in particular in the radial direction. Preferably, the actuation section 16 is arranged between the shaft 2 and the holding section 15, in particular in the radial direction. Expediently, the actuation section embraces or runs around the shaft 2. The actuation section 16 is expediently distanced to the shaft 2.

The actuation section 16 is preferably movably, in particular rotationally movably mounted relative to the holding section 15 and/or relative to the braking section 14. Expediently, the actuation section 16 is rotatably mounted, in particular about a rotation axis which runs parallel to the x-direction.

In particular, the actuation section 16 is designed in an annular and/or circular-cylinder-shaped manner and is expediently arranged coaxially to the shaft 2. The actuation section 16 is expediently designed as an actuation ring.

The actuation section 16 expediently comprises an in particular annular base section 39 which in particular is aligned coaxially to the x-direction. The actuation section 16 comprises for example a plurality of actuation projections 41 which expediently extend in the x-direction, in particular coming from the base section 39. By way of example, the number of actuation projections 41 is equal to the number of braking bodies 3. The actuation projections 41 in particular are designed as actuation pins. For an improved overview, in each of FIGS. 2, 3, and 5, only three actuation projections 41 are provided with the reference numeral "41".

The actuation projections 41 expediently lie on a circular path which runs around the shaft 2. By way of example, the actuation projections 41 are distanced to the shaft 2 and/or the braking section 14.

Each actuation projection 41 is expediently arranged between two braking bodies 3. Each actuation projection 41 expediently bears on a respective braking body 3 in the release state.

As mentioned above, the actuation section 16 in particular is mounted in a rotatably movable manner. The movement of the actuation section 16 is also to be denoted as an actuation movement. For the actuation movement, the actuation section 16 expediently only rotates by a rotation angle of less than 90 degrees, in particular less than 45 degrees or less than 30 degrees.

The actuation section 16 is expediently brought into the actuation movement by way of the actuator unit 6.

The actuator unit 6 expediently comprises an electrical actuator, in order to bring the actuation section 16 into the actuation movement. Expediently, the actuator unit 6 comprises a solenoid and/or a piezo-unit, in order to bring the actuation section 16 into the actuation movement. Alternatively or additionally to this, the actuator unit 6 comprises a pneumatic cylinder, in order to bring the actuation section 16 into the actuation movement.

Furthermore, the actuator unit 6 can comprise a different designed actuator for bringing the actuation section 16 into the actuation movement, in particular a piezoelectric actuator, an electromagnetic actuator, a shape memory alloy actuator (SMA actuator), an electroactive polymer actuator (EAP actuator), a magnetic shape memory actuator (MSM actuator), a pneumatic actuator, a hydraulic actuator, a pyro-actuator, a mechanical actuator, an electrostrictive actuator and/or a thermal actuator.

The braking state and the release state are to be dealt with in more detail hereinafter.

Firstly to the release state:

In the release state, expediently no contact exists between the braking bodies 3 and the in particular rotating shaft 2. In the release state, expediently a gap, in particular an air gap is present between the braking bodies 3 and the shaft 2, in particular in the radial direction (relative to the longitudinal axis of the shaft 2). In the release state, the braking bodies 3 exert no braking force upon the shaft 2 and/or the tool 1.

In the shown example, the braking bodies 3 in the release state are in contact with the braking section 14. Alternatively to this, the braking device 12 can also be designed in a manner such that in the release state the braking bodies 3 are not in contact with the braking section 14.

Each body axis 22 of the braking bodies 3 expediently points in another spatial direction. Expediently in the release state, each body axis 22 is pivoted relative to a radial direction (with respect to the shaft 2), in particular about the same angle.

By way of example, the braking bodies 3 are held in the release state by the actuation section 16. By way of example, an actuation projection 41 which holds the respective braking body 3 in the pivoted position bears on each braking body 3. Each actuation projection 41 expediently bears on the bearing section 24 and/or on the first contact section 17 of a respective braking body 3.

Expediently, in the release state no contact exists between rotating and stationary parts, so that in particular no loss of moment is present.

The braking state is to be dealt with hereinafter.

By way of example, in the braking state, the braking bodies 3 are in contact with the braking section 14.

In the braking state, the braking bodies 3 are clamped between the braking section 14 and the shaft 2, in particular in the radial direction (with respect to the longitudinal axis of the shaft 2).

The braking bodies 3 can also expediently be denoted as clamping bodies. In the braking state, the braking bodies 3 expediently in a force-fitting manner connect the shaft 2 and the braking section 14. In particular, in the braking state the braking bodies 3 are in a force-fitting manner connected to the shaft 2 and to the braking section 14.

In the braking state, the braking bodies 3 are pivoted with respect to the release state about their own pivot axis. Each body axis 22 of the braking bodies 3 expediently points in a different spatial direction. Expediently, each body axis 22 is oriented in a radial direction (with respect to the shaft 2).

As to how the braking bodies 3 are brought from the release position into the braking position is to be dealt with in more detail hereinafter.

The tool apparatus 10 is designed to bring the braking bodies 3 from the release state into the braking state by way of pivoting the braking bodies 3. Expediently, the braking bodies 3 are all pivoted in the same rotation direction. In particular, the rotation direction is opposite to the rotation direction of the shaft 2. Expediently, a pivoting is effected inwards. In particular, a pivoting is effected about an axis which is parallel to the rotation axis of the shaft. By way of the ramp-like contour, a change of the effective diameter of the braking body results. Expediently, the tool apparatus 10 is further designed to bring the braking bodies 3 from the braking state into the release state by way of pivoting the braking bodies 3. Expediently, the tool apparatus 10 is designed to, by way of pivoting the individual braking bodies 3, selectively create or release the braking force coupling between the shaft 2 and the braking section 14.

The actuation section 16 is expediently in contact with the braking bodies 3. The tool apparatus 10 is preferably designed to bring the actuation section 16 into an actuation movement, in order to effect the braking bodies 3 changing from the release state into the braking state. In particular, the actuation movement is a rotation movement of the actuation section 16.

Expediently, the tool apparatus 10 is designed to bring the actuation section 16 into the actuation movement on the basis of the detected emergency state.

The pivoting of the braking body 3 out of the release state is expediently effected by way of the actuation movement of the actuation section. The actuation movement in particular is a movement of the actuation section relative to the holding section 15 and/or relative to the braking section 14.

According to an exemplary design, the braking bodies 3 are biased. The biasing of the braking bodies 3 is expediently achieved by way of the braking bodies 3 being spring-loaded, in particular by way of one or more spring elements (not shown in the figures). In the release state, the actuation section 15 counteracts the biasing, in particular by way of a positive fit, and thus prevents or blocks the pivoting movement of the braking bodies 3. In particular, the actuation section 15, by way of example the actuation projections, are arranged in the respective pivot paths of the braking bodies 3, so that the braking bodies 3 cannot be pivoted in the direction of the braking state. By way of the actuation movement of the actuation section 15, the blocking of the pivoting movement by the actuation section 15 is lifted; by way of example the actuation projections 41 are each pivoted out of the pivoting paths of the braking bodies. The pivoting paths which are necessary for the pivoting of the braking bodies 3 are released. A pivoting of the braking bodies 3 is effected due to the biasing of the braking bodies 3. In particular, the first contact sections 17 are pivoted towards the shaft 2. By way of example, the pivoting is effected in the clockwise direction.

According to an alternative design, the actuation section 16 serves for bringing the braking bodies 3 into the pivoting movement by pushing, and thus for bringing them from the release state into the braking state. Expediently, the braking bodies 3 are actively pivoted by the actuation section 16. With this alternative design, the braking bodies 3 are expediently not biased and/or not spring loaded.

The braking device 12 is expediently designed in a self-reinforcing manner, so that a movement of the shaft 2 is used to amplify the braking effect of the braking bodies 3 upon the shaft 2 and/or for shortening the braking time.

The tool apparatus 10 is designed to bring, in the course of the braking procedure, the braking bodies 3 from the release state into a carry-along state and from the carry-along state into the braking state. The carry-along state in particular is given in a pivoting position of the braking bodies 3 between the release state and the braking state. In the carry-along state, the braking bodies 3 are carried along by way of a movement of the shaft 2, so that the change into the braking state is assisted by the movement of the shaft 2.

The braking bodies 3 starting from the release state are hence moved into the carry-along state. In the carry-along state, a contact between the braking bodies 3 and the shaft 2 occurs, in particular between the first contact sections 17 and the shaft 2. On account of this contact, the braking bodies 3 are carried along by the rotation movement of the shaft 2. Expediently, in the carry-along state, the braking bodies 3 are carried along by the shaft 2 in the same direction in which they have moved before the carry-along state.

By way of example, the braking bodies 3 firstly move out of the release state in a first direction, by way of example the clockwise direction. In this movement, the braking bodies 3, in particular the first contact sections 17, are led to the shaft 2 until they contact the shaft 2 and the carry-along state is given. In the carry-along state, the braking bodies 3 are moved further in the first direction by way of the rotation of the shaft 2 until the braking bodies 3 are situated in the braking state. The shaft 2 by way of example rotates opposite to the clockwise direction.

The braking force which is exerted from the braking bodies 3 onto the shaft 2 is preferably greater in the braking state than in the carry-along state.

As already explained beforehand, the contact contour 18 is designed in a ramp-shaped manner. During the pivoting of the braking body 3, the contact contour 18 expediently rolls on the shaft 2. On account of the increasing radius of the contact contour, the braking element 3 is increasingly pressed against the shaft 2. In particular, during the pivoting, the braking element 3 is increasingly clamped or compressed between the shaft 2 and the braking section 14. By way of this, the braking force expediently increases further.

An exemplary operation of the tool apparatus 10 is described hereinafter.

Expediently, the tool 1 is driven by the drive unit 5. The workpiece 11 is machined by the driven tool 1. During the machining, a contact between the tool 1 and the body of the user occurs. The control unit 7 detects this contact as an emergency state and thereupon activates the braking device 12. The actuator unit 6 moves the actuation section 16, whereby the braking bodies 3 are brought into the braking state, by which means in turn the shaft 2 and the tool 1 are braked to standstill. In particular, the braking is effected in less than 5 ms.

Expediently, the braking bodies 3 are brought back into the release state, in particular by the actuator unit 6 and/or a manual actuation. The tool 1 is again driven by the drive unit 5. The workpiece 11 or another workpiece is then machined by the tool 1. Expediently, no exchange of the tool 1 and/or of the braking bodies 3 is effected between the braking of the tool 1 and/or of the shaft 1 and the renewed machining.

According to a preferred design, the tool apparatus 10 is designed to bring the braking bodies 3 back into the release state, in particular by way of the actuator unit 6 and/or a further (not shown in the figures) actuator unit. The tool apparatus 10 is preferably designed to bring the braking bodies 3 back into the release state in response to a reset command. The reset command is expediently inputted into the tool apparatus 10 by a user, for example via an input device, in particular button.

Alternatively or additionally to this, the tool apparatus 10 is designed to allow the braking bodies to be brought back into the release state via a manual actuation of the tool 1 and/or of the shaft 2 and/or of an operating element, for example a lever, which is mechanically coupled to the shaft 2.

The invention claimed is:

1. A tool apparatus with a drivable tool, the tool apparatus comprising a shaft which is coupled to the tool, the tool apparatus further comprising:
   at least one braking body,
      wherein the tool apparatus is adapted to bring, in the course of a braking procedure, the at least one braking body from a release state into a braking state,
      wherein, in the braking state, the at least one braking body is in contact with the shaft and thereby exerts a braking force upon the shaft, so that the shaft and thereby also the tool are braked and
      wherein in the release state the at least one braking body is not in contact with the shaft,
      wherein the tool apparatus is adapted to bring, in the course of the braking procedure, the one or more braking bodies from the release state into a carry-along state and from the carry-along state into the braking state, wherein, in the carry-along state, the one or more braking bodies are carried along by a movement of the shaft, so that the bringing of the one or more braking bodies into the braking state is assisted by way of the movement of the shaft.

2. The tool apparatus according to claim 1, comprising a plurality of braking bodies which are distributed around the shaft in a circumferential direction, wherein the tool apparatus is adapted to bring, in the course of the braking procedure, the plural braking bodies from the release state into the braking state, wherein in the braking state the plural braking bodies are in contact with the shaft and thereby exert a braking force upon the shaft, so that the shaft and thereby also the tool are braked and wherein in the release state the plural braking bodies are not on contact with the shaft.

3. The tool apparatus according to claim 1, wherein the tool apparatus is adapted to bring the at least one braking body from the release state into the braking state by way of pivoting.

4. The tool apparatus according to claim 1, wherein the at least one braking body each comprises a first contact section with a ramp-like contact contour which in the braking state is in contact with the shaft.

5. The tool apparatus according to claim 1, wherein the tool apparatus further comprises a braking section which surrounds the shaft.

6. The tool apparatus according to claim 5, wherein in the braking state the at least one braking body is clamped between the braking section and the shaft.

7. The tool apparatus according to claim 1, wherein the tool apparatus comprises an actuation section, which is in contact or can be brought into contact with the at least one braking body, and is adapted to carry out an actuation movement with the actuation section in order to cause the at least one braking body being brought from the release state into the braking state.

8. The tool apparatus according to claim 1, wherein the tool apparatus is adapted to detect an emergency state and to activate the braking procedure on the basis of the detected emergency state.

9. The tool apparatus according to claim 8, wherein the tool apparatus is adapted to detect, as the emergency state, a contact between the tool and the human body.

10. The tool apparatus according to claim 8, wherein the tool apparatus is adapted to detect a kickback as the emergency state.

11. The tool apparatus according to claim 1, wherein the tool apparatus is adapted to bring the tool to a standstill within 10 ms or less by way of carrying out the braking procedure.

12. The tool apparatus according to claim 1, wherein the tool apparatus is adapted to bring the at least one braking body from the braking state back into the release state.

13. The tool apparatus according to claim 1, wherein the tool apparatus is adapted in a manner such that the at least one braking body can be brought from the braking state back into the release state by way of a manual actuation.

14. A method for braking a drivable tool of a tool apparatus according to claim 1 comprising at least one braking body, the tool being coupled to a shaft, comprising the step:
bringing the at least one braking body from a release state, in which the at least one braking body is not in contact with the shaft, into a braking state, in which the at least one braking body is in contact with the shaft and thereby exerts a braking force upon the shaft, so that the shaft and the tool are braked,
wherein in the course of the braking procedure the tool apparatus brings the at least one braking body from the release state into a carry-along state and from the carry-along state into the braking state, wherein, in the carry-along state, the at least one braking body is carried along by a movement of the shaft, so that the bringing of the at least one braking body into the braking state is assisted by way of the movement of the shaft.

15. A tool apparatus with a drivable tool, the tool apparatus comprising a shaft which is coupled to the tool, the tool apparatus further comprising:
at least one braking body,
wherein the tool apparatus is adapted to bring, in the course of a braking procedure, the at least one braking body from a release state into a braking state,
wherein, in the braking state, the at least one braking body is in contact with the shaft and thereby exerts a braking force upon the shaft, so that the shaft and thereby also the tool are braked and
wherein in the release state the at least one braking body is not in contact with the shaft,
wherein the tool apparatus is adapted in a manner such that the at least one braking body can be brought from the braking state back into the release state by way of a manual actuation.

* * * * *